United States Patent [19]

Shimomura

[11] 3,958,108

[45] May 18, 1976

[54] BAROMETRIC ALTIMETER WITH DIGITAL LINEARIZATION

[76] Inventor: Naonobu Shimomura, No. 13-8, Sakuragaoka-cho, Shibuya, Tokyo, Japan

[22] Filed: Oct. 11, 1974

[21] Appl. No.: 514,229

[30] Foreign Application Priority Data

Oct. 13, 1973 Japan.............................. 48-115140
Apr. 5, 1974 Japan............................... 49-38635
June 20, 1974 Japan............................. 49-70675

[52] U.S. Cl. ............................. 235/150.25; 73/384
[51] Int. Cl.² ..................... G06F 15/20; G01L 7/00
[58] Field of Search............. 235/150.2, 152, 151.3, 235/150.53; 73/384–387

[56] References Cited
UNITED STATES PATENTS

| | | | |
|---|---|---|---|
| 2,745,278 | 5/1956 | Roberts et al. | 73/384 X |
| 3,242,736 | 3/1966 | Winter et al. | 73/384 |
| 3,693,405 | 9/1972 | Shimomura | 73/384 |
| 3,726,138 | 4/1973 | Kosakowski et al. | 73/384 X |
| 3,729,999 | 5/1973 | Shimomura | 73/384 |

Primary Examiner—Edward J. Wise
Attorney, Agent, or Firm—Staas & Halsey

[57] ABSTRACT

This invention discloses apparatus to obtain altitude measurement in digital value by linearizing the relation between the actual altitude and the output signal of a pressure sensor, by means of a digital function generator. An accurate measurement is made possible under the standard atmosphere, adopted by International Civil Aviation Organization (ICAO), where the relations between the altitude, static pressure and temperature are given. The digital function generator of the invention generates a function represented by a polynomial in the form of a power series of a variable. Because of the versatility of the above function, a variety of pressure sensors having different response characteristics may be used for this invention.

5 Claims, 20 Drawing Figures

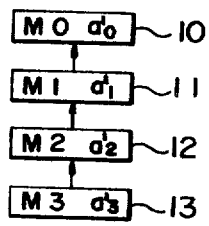
FIG. 1
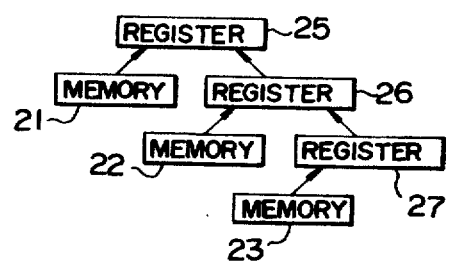
FIG. 2
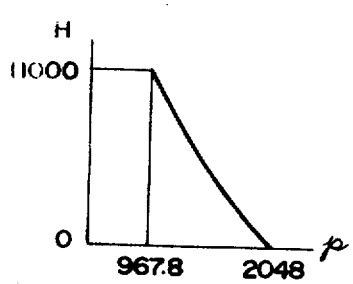
FIG. 4A
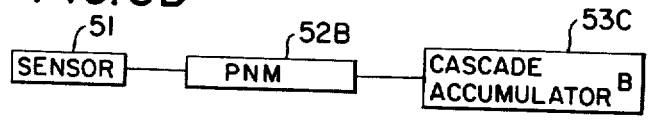
FIG. 5D
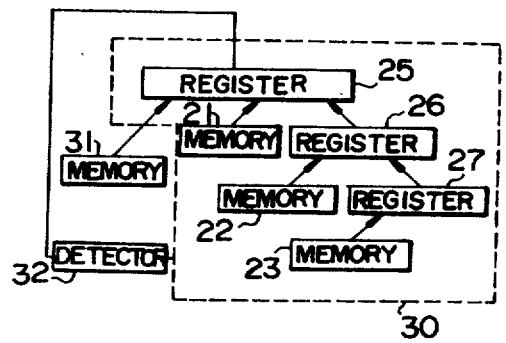
FIG. 3
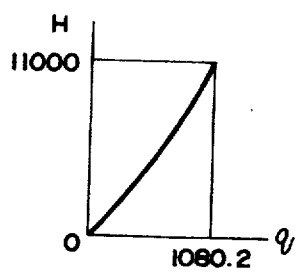
FIG. 4B
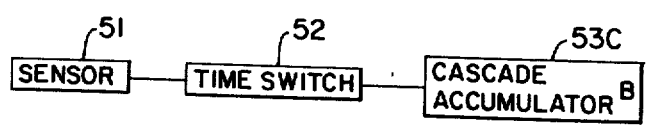
FIG. 5C
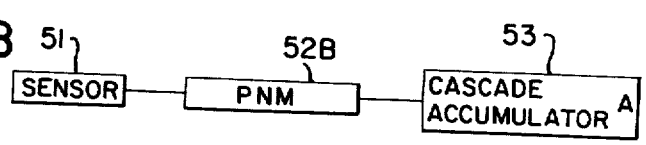
FIG. 5A
FIG. 5B

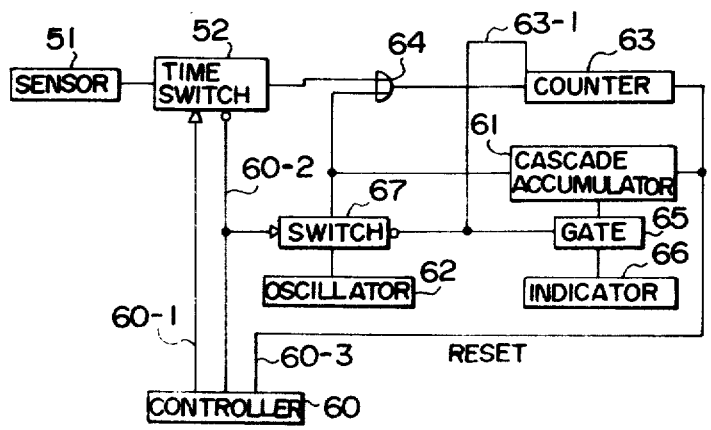
FIG. 6
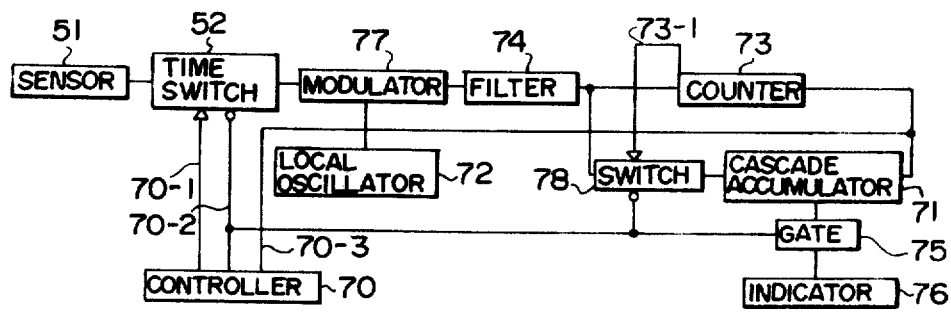
FIG. 7
FIG. 8
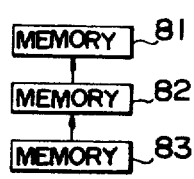
FIG. 9
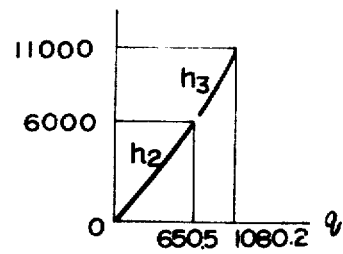

BAROMETRIC ALTIMETER WITH DIGITAL LINEARIZATION

BACKGROUND OF THE INVENTION

1. Field of the Invention

This invention relates to barometric altimeters, and particularly to those accurate electronic barometric altimeters used in aircraft.

DESCRIPTION OF PRIOR ART

The principle of barometric altimeters is based on the fact that the atmospheric pressure decreases as the altitude increases, and the altitude is obtained by measuring the static pressure of the atmosphere.

In most conventional barometric altimeters, the atmospheric pressure is measured by the deformation of an aneroid capsule due to the change of pressure. This deformation is indicated after being mechanically magnified by a train of gears and links. As the deformation is magnified greatly, even a slight friction in the mechanism causes an error. In order that the indicator be graduated in a linear scale, which is essential for a accurate altitude indication, the altimeter should also incorporate a delicate mechanism to compensate for the non-linear relationship between the altitude and the pressure and the temperature distribution in the atmosphere.

Where the digital value of the altitude is required in automatic altitude reporting systems, complex high cost encoders, such as the optical type, have been used.

The applicant has disclosed a prior invention in U.S. Pat. No. 3,729,999 that patent discloses a barometric altimeter in which neither mechanical magnification nor non-linear mechanical transformation is needed. That patented altimeter produces an accurate altitude measurement, according to the ICAO standard atmosphere, in digital form by means of electronic procedure. The pressure sensor used in the above identified patented invention is limited to that which produces an electrical signal proportional to the pressure. The applicant has disclosed another invention in copending U.S. patent application Ser. No. 410,116, filed Oct. 26, 1973, and entitled Barometric Altimeter. There a pressure sensor is used, which produces an electrical signal proportional to a power of the pressure. Although the latter invention is more versatile than the former one, it is still limited to a sensor having certain specific characteristics.

SUMMARY OF THE INVENTION

The object of this invention is to provide an improved type of barometric altimeter over the prior art, with more versatility in the choice of the pressure sensor.

Another object of this invention is to provide a barometric altimeter which gives a digital indication, by incorporating the general trends of digitizing the avionic information with simplified dedicated digital circuitry.

Another object of this invention is to provide a barometric altimeter suitable to be used in an automatic altitude reporting system, a discrete address beacon system for the future air traffic control, or a type of collision avoidance system where digital information of altitude is essential. Another object of this invention is to make it possible to construct a barometric altimeter by means of digital technology without depending upon critical mechanical delicacy.

Briefly stated, a pressure sensor having practically any particular response characteristics, may be used in the barometric altimeter of this invention. Using the numerical table of the ICAO standard atmosphere, the electrical output of the pressure sensor is plotted against the altitude of the ICAO table. A curve fitting technique is used to represent the relationship between the value of the altitude H and the value of the sensor output S in the form of a polynomial:

$$H = a_0 + a_1 S + a_2 S^2 + a_3 S^3$$

or $$S = b_0 + b_1 H + b_2 H^2 + b_3 H^3$$

In accordance with some embodiments of this invention, cascade accumulation means are utilized to generate a digital function defining the relation between two variables X and Y represented by $$Y = a_0 + a_1 X + a_2 X^2 + a_3 X^3$$

or $$X = b_0 + b_1 Y + b_2 Y^2 + b_3 Y^3$$

By virtue of the identical form of the above characteristic equations and the functions generated by the cascade accumulator means the value of the altitude is obtained for a given value of the output of a pressure sensor.

The barometric altimeter designed under this invention is very simple in its construction and gives an accurate digital value of the altitude to be measured and is expected to achieve highly reliable performance.

BRIEF DESCRIPTION OF THE DRAWINGS

FIG. 1 is an explanatory drawing showing the principle of a type A cascade accumulator for use in this invention.

FIG. 2 is also an explanatory drawing showing another principle of a type A cascade accumulator for use in this invention.

FIG. 3 is an explanatory drawing showing the principle of a type B cascade accumulator for use in this invention.

FIGS. 4A and 4B show relations between the pressure sensor output values and the altitude.

FIG. 5A shows a block diagram of an embodiment of this invention using a time switch and a type A cascade accumulator.

FIG. 5B shows a block diagram of an embodiment of this invention using a pulse number modulator and a type A cascade accumulator.

FIG. 5C shows a block diagram of an embodiment of this invention using a time switch and a type B cascade accumulator.

FIG. 5D shows a block diagram of an embodiment of this invention using a pulse number modulator and a type B cascade accumulator.

FIG. 6 shows a block diagram of an accumulation and indication embodiment of this invention.

FIG. 7 shows a block diagram of sensor signal modulation embodiment of this invention.

FIG. 8 shows an explanatory block diagram of a cascade accumulator to be used for the measurement of the altitude by subdividing the range of measurement;

FIG. 9 shows the principle of measurement, by subdividing the range of the measured altitude.

DETAILED DESCRIPTION OF THE PREFERRED EMBODIMENTS

Figure 10A:
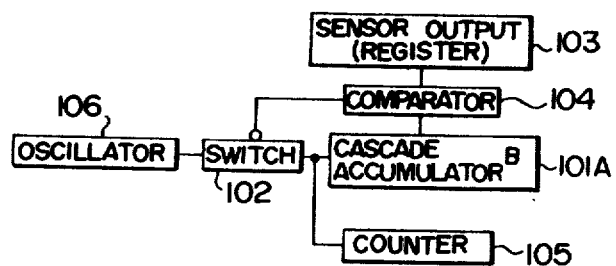
FIG. 10A shows a block diagram of a comparator embodiment of this invention using a type B cascade accumulator.

The numerical table of the standard atmosphere adopted by ICAO shows the relationship between the altitude h and the atmospheric pressure P. The electrical output of a pressure sensor S versus the pressure P in which the sensor is placed, is defined with the response characteristics of the particular sensor. Hence, the altitude H is expressed as a function of the sensor output S such as:

$$H = F(S); \qquad 1$$

or by its inverse function:

$$S = G(H). \qquad 2$$

These functions can be respectively approximated by the power series of their variables, such as:

$$F(S) = a_0 + a_1 S + a_2 S^2 + a_3 S^3 \qquad 3$$

$$G(H) = b_0 + b_1 H + b_2 H^2 + b_3 H^3 \qquad 4$$

where $a$'s and $b$'s are constants

In some cases, the expressions of (3) and (4) may be justified by the Taylor's or Maclaurin's Theorem in mathematics. However, even when such mathematical expansion in series does not show good convergence, the relation of the two values H and S can be expressed by a polynomial of a limited number of terms of powers by the art of curve fitting of one the values as shown in the above expressions (3) and (4) with sufficient accuracy for practical purposes. As shown later, with respect to the various embodiments of this invention, the relations of the outputs of the pressure sensors and the altitudes to be measured can be represented with good accuracy by the formulae of the expression forms (3) and (4).

On the other hand, several efficient apparatuses to generate a polynomial function of the form (3) or (4) are disclosed in my copending U.S. patent application of Ser. No. 505,849 filed on Sept. 13, 1974 under the title "Digital Function Generator". Among others, the descriptions of the first kind and second kind of cascade accumulators of type A, and the cascade accumulators of type B, and the drawings FIG. 1, FIG. 2, FIG. 3, FIG. 4, FIG. 5, FIG. 7, FIG. 8, FIG. 10, of the above identified patent application, are useful for the implementation of the present invention and are quoted elsewhere in this specification. So that, for the purpose of convenience, the above patent application of "Digital Function Generator" is hereafter acronymed as DFG application. Further by means of selecting the scaling of the measurement properly, the coefficient $a_1$ of the formula (3) and coefficient $b_1$ of the formula (4) can be made close to unity. In the present invention, the cascade accumulators, also described in the DFG application, may be substituted by the mode A or mode B non-linear counters disclosed and typically represented by the drawings FIG. 1 and FIG. 2 in my copending allowed U.S. patent application Ser. No. 248,141 filed on Apr. 27, 1972 now U.S. Pat. No. 3,843,872 and entitled "Temperature Measuring Equipment With Polynomial Synthesis"

FIG. 1 herein shows the principle of a type A cascade accumulator of DFG application. In the figure, M0, M1, M2 and M3 are memories, and cascade addition is performed by algebraically adding the contents of the memories M3, M2 and M1 to the memories M2, M1 and M0 respectively. By loading numerical values $a_0'$, $a_1'$, $a_2'$ and $a_3'$ in the memories M0, M1, M2 and M3 respectively, as their initial values; and repeating the above described cascade additions X times, the numerical value Y expressed by $$Y = a_0 + a_1 X + a_2 X^2 + a_3 X^3. \qquad 5$$

is obtained in the memory M0. In the first kind of type A cascade accumulator, the contents of the memories M1 and M2 after being are added with the contents of memories M2 and M3 respectively, and are in turn added to the memories M0 and M1 respectively. The initial values to be loaded at the memories are given by:

$$a_0' = a_0; \qquad 6$$

$$a_1' = a_1 - a_2 + a_3; \qquad 7$$

$$a_2' = 2a_2 - 6a_3; \qquad 8$$

$$a_3' = 6a_3. \qquad 9$$

In the second kind of type A cascade accumulator, the contents of the memories M1 and M2 are added to the contents of the memories M0 and M1 respectively before they are added with the contents of the memories M02 and M3 respectively. The initial values to be loaded at the memories are given by:

$$a_0' = a_0 \qquad 10$$

$$a_1' = a_1 + a_2 + a_3 \qquad 11$$

$$a_2' = 2a_2 + 6a_3 \qquad 12$$

$$a_3' = 6a_3 \qquad 13$$

In the DFG application, FIG. 3 shows a first kind of cascade accumulator of bit serial word parallel additions, FIG. 5 shows a first kind cascade accumulator of bit serial and word serial additions, FIG. 7 shows a second kind cascade accumulator of bit serial word parallel additions and FIG. 8 shows a second kind cascade accumulator of bit serial and word serial additions. Each of these cascade accumulators comprises $n+1$ memories of addresses $0, 1, 2, \ldots, n$. One cycle of cascade additions is performed by algebraically adding the contents of memories of addresses $1, 2, \ldots, n$ to the memories of addresses $0, 1, 2, \ldots, n-1$, respectively, by means of a dedicated circuit in which the interconnecting relationships between the inputs and the outputs of the memories and the algebraic adders participating in said cascade additions are held unchanged thus, the out digits from any one of the memories are led to the same one of the inputs of an algebraic adder, and the output digits from any one of the algebraic adders are led, among others, to the input of a same memory, during one cycle of cascade additions. As a result, the circuits of these cascade accumulators are simple and do not need any complex control to perform cascade additions.

FIG. 2 shows another configuration of a type A cascade accumulator in which 21, 22 and 23 are memories, and 25, 26 and 27 are registers. One cycle of cascade additions is performed by algebraically adding the contents of memories 21, 22 and 23 to the registers 25, 26 and 27 respectively. The content of register 27 is algebraically added to the register 26, and the content of register 26 is algebraically added to the register 25. In this configuration the initial values $a_0'$, $a_1'$, $a_2'$ and $a_3'$ may be loaded in the register 25, memories 21, 22 and 23 respectively, or for example, the initial value to be loaded in the memory 21 may be shared with the register 26. When, in the equation (5), the coefficient $a_1$ is unity, the initial value $a_1'$ given by the equation (7) may be shared in such a way that $a_1=1$ is loaded at the memory 21 and the remaining $-a_2+a_3$ is loaded in the register 26 as their respective initial values. In the cascade accumulator of FIG. 2, the register 25 receives "one" from the memory 21 at each cycle of cascade additions, so that the register 25 counts a command signal at each cycle of cascade additions, as well as receiving the content from the register 26. This is similar to the non-linear counter described in the aforesaid U.S. Pat. No. 3,843,872. Such a counter may be regarded as a specialized case of the memory M0 of FIG. 1.

FIG. 3 shows the principle of a type B cascade accumulator. In the figure, the dotted line enclosure 30 shows a type A cascade accumulator. Although the figure is depicted with the cascade accumulator of FIG. 2, any version of a type A cascade accumulator may be used instead shown in that of FIG. 2. In addition to the type A cascade accumulator 30, a memory 31 and an increment detector 32 are incorporated to make this a type B cascade accumulator. When a primary command pulse is applied, the content of the memory 31 is added to the register 25 (when the cascade accumulator of FIG. 1 is used in the dotted line enclosure 30, the register 25 is replaced by the memory M0 of FIG. 1), and the increment detector 32 generates secondary command pulses corresponding in number to the increment of the content of the register 25 and causes the cascade additions of the type A cascade accumulator 30 to be performed. The number of cycles of cascade additions corresponds to the number of secondary command pulses. When X primary command pulses are applied, the digital value Y given by the following equation (14) is obtained at the register 25.

$$X = b_1Y + b_2Y^2 + b_3Y^3 \qquad 14$$

The operation of the type B cascade accumulator is also described in detail in the DFG application, with regard to its FIG. 10. Y also indicates the number of cycles of cascade additions which occur in the type A cascade accumulator 30 of FIG. 3 with respect to the number of primary command pulses X. Any one of the first kind or second kind of type A or type B cascade accumulators, or the mode A or the mode B non-linear counters mentioned above is useful to implement the barometric altimeter of the present invention.

The relation between the altitude and the atmospheric pressure of the ICAO standard atmosphere is shown in the following table in which H is the altitude in meters and P is the atmospheric pressure in mb (millibars).

The versatility of the present invention is shown by assuming a pressure sensor of a type such as that shown in FIG. 2 of my copending U.S. patent application Ser. No. 410,116 filed on Oct. 26, 1973 under the title "Barometric Altimeter", is used.

TABLE

| H | P | P' | f,p | $h_1$ | $h_2 = h_3$ | q | q' |
|---|---|---|---|---|---|---|---|
| 0 | 1013.3 | 1013.3 | 2048.0 | 0 | 0 | 0 | 0 |
| 1000 | 898.7 | 899.0 | 1928.7 | 1007 | 994 | 119.3 | 119.2 |
| 2000 | 795.0 | 795.2 | 1814.0 | 2005 | 1994 | 234.0 | 234.0 |
| 3000 | 701.1 | 701.2 | 1703.5 | 3002 | 3000 | 344.5 | 344.5 |
| 4000 | 616.4 | 616.3 | 1597.3 | 3999 | 4005 | 450.7 | 450.7 |
| 5000 | 540.2 | 540.1 | 1495.3 | 4998 | 5007 | 552.7 | 552.6 |
| 6000 | 471.8 | 471.7 | 1397.5 | 5998 | =6000= | 650.5 | 650.5 |
| 7000 | 410.6 | 410.6 | 1303.7 | 7000 | 6995 | 744.3 | 744.2 |
| 8000 | 356.0 | 356.2 | 1213.9 | 8004 | 7998 | 834.1 | 834.0 |
| 9000 | 307.4 | 307.7 | 1128.0 | 9006 | 9004 | 920.0 | 919.9 |
| 10000 | 264.4 | 264.6 | 1046.1 | 10005 | 10005 | 1001.9 | 1001.9 |
| 11000 | 226.3 | 226.3 | 967.8 | 11000 | 11000 | 1080.2 | 1080.2 |

The output frequency of this vibrating type pressure sensor varies in proportion to the square root of the pressure sensed. When the output frequency of this type of pressure sensor is set to 2048Hz at sea level, the corresponding frequency at various altitudes is shown by $f$ Hz in the above table and is expressed in Hz. By gating this frequency for 1 second, and converting the cycles to pulses, the number of pulses $p$ obtained are equal to $f$. The relation between $p$ and H, as shown in FIG. 4A, is non-linear. This relation is closely approximated by:

$$H \approx h_1 = 27520.8 - 21.91544p + 5.78276 \times 10^{-3}p^2 - 8.02406 \times 10^{-7} p^3 \qquad 15$$

The values of $h_1$ calculated by the above equation (15) are shown in the table and are seen to be close in their values to the corresponding values of H.

FIG. 5A shows a block diagram of an embodiment of the barometric altimeter of this invention. In FIG. 5A, 51 is a vibrating type pressure sensor as indicated above, 52 is a time switch which allows the output signal of the pressure sensor 51 to pass for 1 second, thus supplying $p$ pulses to the type A cascade accumulator 53 as the command pulses for generating the function of equation (15). The altitude H is obtained in the memory M0 of the cascade accumulator 53.

FIG. 5B shows a block diagram of another embodiment of this invention when the pressure sensor of the type which produces an analog output is used. In FIG. 5B the sensor output 51 is converted into a proportional number of pulses by a pulse number modulator 52B and those pulses are applied as command pulses for the type A cascade accumulator 53.

Figure 14B:
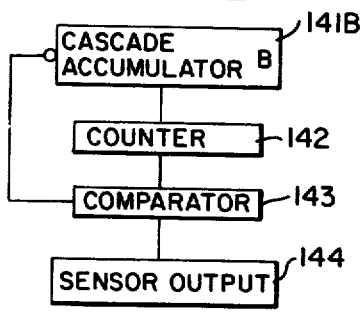
FIG. 14B shows a block diagram of another comparator embodiment of this invention using a type B cascade accumulator.
Figure 14A:
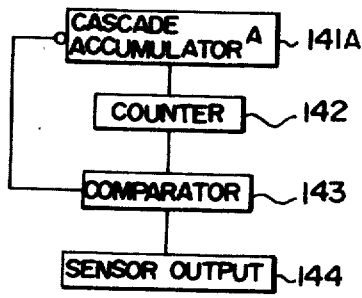
FIG. 14A shows a block diagram of another comparator embodiment of this invention using a type A cascade accumulator.

FIG. 14A shows another embodiment of the barometric altimeter of the invention. In FIG. 14A, 141A is a type A cascade accumulator which is run with an internal clock; the number of cycles of cascade additions are counted by the counter 142, which count is compared by a comparator 143 with the sensor output 144. When the content of the counter 142 becomes equal to the sensor output 144 the comparator 143 generates a signal to stop the cascade accumulating operation of the type A cascade accumulator 141A, and the altitude is obtained in the cascade accumulator 141A. When the sensor output is analog, the content of the counter 142 is converted to an analog value and compared with the sensor output by an analog comparator.

Because of the versatility of this invention wherein function generation is obtained by means of cascade accumulation, pressure sensors having response characteristics other than those of the above examples can also be utilized. For example, when a pressure sensor of linear characteristics is used, the relation between the altitude and the sensor output is expressed, within an error of 3.5m up to the altitude of 11000m, by a fifth power polynomial of the type of equation (3). Therefore an altimeter according to this invention can be realized by a cascade accumulator having six stages of memories similar to that of FIG. 1.

Other embodiments of the invention operate under the assumption that by inverting the value $p$ to $q$ so that $q=0$ at sea level or:

$$q = 2048 - p \qquad 16$$

the relation between $q$ and H is therefore as shown by FIG. 4B, and the equation (15) is transformed to:

$$h_1 = 8.32586q + 8.52778 \times 10^{-4}q + 8.02406 \times 10^{-7}q^3 \qquad 17$$

FIG. 6 shows an embodiment of a barometric altimeter of this invention functioning according to the equation (17). In the figure, a sensor 51 and a time switch 52 are same as the corresponding numbers of FIG. 5A.

The controller 60 turns the switch 52 on through the line 60-1. Then, after 1 second the controller 60 turns the switch 52 off through the line 60-2, and simultaneously turns the switch 67 on. During this 1 second period, the counter 63, which has a capacity of 2048, counts the $p$ pulses through switch 52 and the gate 64. Then, when the switch 67 is turned on, counter 63 starts to count the output of the oscillator 62 through the switch 67 and the gate 64. When the counter 63 counts $q$ pulses from the oscillator 62 it generates an overflow pulse through the line 63-1 which turns the switch 67 off. The cascade accumulator 61, which is constructed to generate the function (17), is commanded by the $q$ pulses passing through the switch 67 and generates the value $h_1$ of equation (17). The overflow pulse through 63-1 also controls the gate 65 to allow the altitude obtained at the cascade accumulator 61 to be transmitted to the indicator 66 or if desired, to an output line (not shown). A suitable code converter, such as binary to decimal, may be incorporated. After the above operations the controller 60 resets the cascade accumulator 61 through line 60-3 for the next cycle of measurement.

FIG. 7 shows another embodiment of this invention. In the figure, a sensor 51 and a time switch 52 are the same as those of FIG. 5A. The controller 70 turns the switch 52 on for 1 second through the line 70-1 and the output signal frequency $f$ from the sensor 51 through the switch 52 is heterodyned by the modulator 77 with the local oscillator 72 of frequency 3072Hz. The lower side band of the modulated frequency from modulator 77, which is 1024Hz and 2104.2Hz at H=0 and H=11000m respectively, passes through the low pass filter 74 and the cycles are counted by the counter 73 of capacity 1024. When the counter 73 counts 1024 it generates a overflow pulse through line 73-1 which turns the switch 78 on. Thus, until the time when the switch 52 is turned off by the controller 70 through line 70-2, after one second of conducting period, $q$ command pulses pass through the switch 78 and are applied to the cascade accumulator 71 which generates the function (17). The altitude is obtained in the cascade accumulator 71. The control signal through line 70-2 also turns the switch 78 off to prepare for the next operation and causes the value of the altitude obtained at the cascade accumulator 71 to be gated through the gate 75 for indication or transmission. The controller sends out a reset signal through line 70-3 to the counter 73 and the cascade accumulator 71 to reset them to their initial conditions.

Adjustment for the change of the reference altitude may be attained by means of varying either the timing for the switch 52, the capacity (initial preset value) of counter 73, or the frequency of the local oscillator 72.

By using a higher degree polynomial function of the variables $p$ or $q$ than those of the equations (15) or (17), a higher accuracy measurement than that shown in the table is possible. For this purpose the number of stages of cascade additions shown by FIG. 1 is to be increased and this is described in detail in the DFG application. Alternatively, by subdividing the range of the measurement into two parts, an altitude measurement can be made with a lower power polynomial function than those of the equations (15) or (17) with sufficient accuracy for practical use. For example, instead of the equation (17) which covers the altitude from 0 to 11000m, the equation:

$$h_2 = 8.12803q + 1.68432 \times 10^{-3}q^2 \qquad 18$$

can be used for the range of the altitude 0 to 6000m, and the equation:

$$h_3 = 582.4 + 6.33651q + 3.06206 \times 10^{-3}q^2 \qquad 19$$

can be used for the range of the altitude 6000 to 11000m. The values of $h_2$ and $h_3$ calculated by the equations (18) and (19) respectively, are shown in the above table and are also seen to be very close to the corresponding values of H in their respective ranges. For the measurement according to the equations (18) and (19), an example of a simplified cascade accumulator is shown by FIG. 8. The cascade accumulation starts first with the initial condition for the equation (18), and a monitoring circuit is incorporated to detect the instant when the content of the memory 81 reaches a predetermined value of 6000. At this time, the contents of the memories of 81, 82 and 83 are replaced with the values of initial conditions for equation (19) at $h_3$=6000. FIG. 9 shows the above process of subdividing the measurement range. These descriptions are made for the measurement below 11000m. It will be understood that for higher altitudes, the same method of this invention can be applied by subdividing the range at 11000m.

FIG. 10A shows another embodiment of this invention using the type B cascade accumulator as shown by FIG. 3. In FIG. 10A, 106 is a oscillator generating pulses and its output is applied, to a type B cascade accumulator 101A as command pulses, through a switch 102. The type B cascade accumulator 101A generates the value of Y in equation (14) when X pulses are applied as command pulses. By substituting X, Y, $b_1$, $b_2$ and $b_3$ in equation (14) by $h$, $q$, and three corresponding coefficients of equation (17) respectively, the type B cascade accumulator 101A generates the value of $q$ of equation (17) when $h_1$ command pulses are applied. The value generated in 101A is compared by the comparator 104 with the content of a register 103 which stores the sensor output $q$. When the coincidence is detected by the comparator 104 it sends a signal to turn the switch 102 off. The number of $h$ command pulses which pass through the switch 102 until the switch 102 is turned off, and thus applied to type B cascade accumulator 101A represent the value of $h_1$ of the equation (17), and these pulses are counted by the counter 105 to obtain the altitude. When a pressure sensor of an analog output response characteristic is used, the output may be converted by an analog to digital converter and stored in the register 103; alternating the value generated in the type B cascade accumulator may be converted by a digital to analog converter to an analog value and compared with the output of the analog sensor.

The value of $q$ in the table can also be expressed approximately by a power series of H:

$$q \approx q' = 0.12147H - 2.25088 \times 10^{-6}H^2 + 1.2298 \times 10^{-11}H^3 \qquad 20$$

The values of $q'$ calculated by the equation (20) are shown in the above table, for different values of H, to approximate the corresponding values of $q$. Further, when a pressure sensor of linear characteristics is used, the value of P in the table may be regarded as the sensor output corresponding to each value of H. The pressure sensor described in my U.S. Pat. No. 3,693,405 entitled "Barometric Altimeter" exhibits such a linear characteristic. There are other linear pressure sensors on the market including semiconductor types which may be used in this invention. The sensor output of these linear characteristics can also be approximated by a power series of the altitude:

$$P = P' = 1013.3 - 0.11973H + 5.5471 \times 10^{-6}H^2 - 1.06025 \times 10^{-10}H^3$$

The values of $P'$ calculated by the above equation (21) are given in the above table for different values of H, and show values approximating the corresponding values of P.

This invention can also be implemented based on the relations represented by the form of the equations (20) and (21).

Figure 10B:
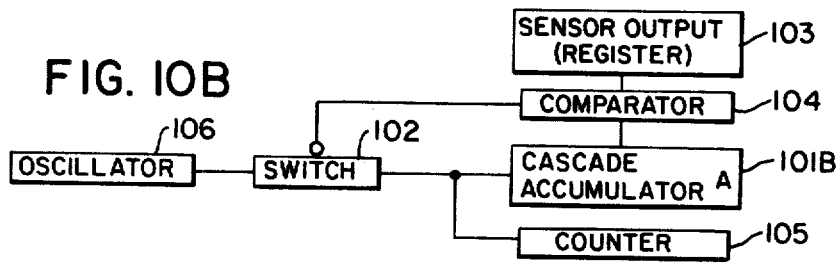
FIG. 10B shows a block diagram of a comparator embodiment of this invention using a type A cascade accumulator.

When a Type A cascade accumulator is used, the configuration of FIG. 10B is used. In FIG. 10B, reference characters, 102, 103, 104, 105 and 106 are the same as the corresponding numbers of FIG. 10A, and 101B is a type A cascade accumulator. The cascade additions of the type A cascade accumulator 101B which generates the function of (20) or (21), are performed by the command pulses through the switch 102; the value generated in the type A cascade accumulator 101B is compared with the sensor output $q$ or P of the register 103 by the comparator 104 and when coincidence is detected by comparator 104, the switch 102 is turned off. The number of command pulses which pass through the switch 102 represent the value of H in equations (20) or (21), and are counted and displayed by the counter 105.

When type B cascade accumulator is used, the configuration of FIG. 5C is used. In FIG. 5C, reference characters, 51 and 52 are the same as the corresponding numbers of FIG. 5A and 53 is a type B cascade accumulator which generates the value of H in equations (20) or (21) against the number of command pulses $q$ or P. When a vibrating pressure sensor is used as sensor 51, its output is gated for a predetermined period of time by the time switch 52 and applied to the type B cascade accumulator 53c to generate H of equation (20).

When an analog pressure sensor is used, the configuration of FIG. 5D is used. In FIG. 5D, reference characters 51 and 52B are the same as the corresponding numbers of FIG. 5B, and 53C is a type B cascade accumulator. The sensor output is converted to proportional number of pulses by a converter or a pulse number modulator 52B and applied as command pulses to the type B cascade accumulator 53C which generates the value of H of equation (21) as a function of the number of command pulses P.

Another embodiment of the invention is represented by FIG. 14B in which reference characters 142, 143 and 144 are the name as the corresponding numbers of FIG. 14A. In this case, 141B is a type B cascade accumulator and is run by internal command pulses. These command pulses are counted by the counter 142, which is compared by comparator 143 with the sensor output $q$ or P in the sensor output 144. When coincidence is detected, the operation of the type B cascade accumulator 141 is stopped. The measured altitude is obtained in the type B cascade accumulator 141B. Alternately, if a pressure sensor of analog output is used, the content of the counter 142 is converted to an analog value and an analog comparator 143 is used.

One of the important features of this invention is that the requirements on the characteristics of the pressure sensors used are not stringent. When the characteristics of an individual pressure sensor deviate from its standard values, the coefficients of the equations (3) and (4) may be modified to match with the specific response characteristics of that pressure sensor. A read only memory, which stores the initial values to be loaded in the memories of the cascade accumulator may be written according to those modified values of the coefficients. Such a process of writing the read only memories according to the calibrated characteristics of the pressure sensors may be done in a very efficient semi-automatic process.

Next, another embodiment of the present invention is described. As is given by the equation (44) of my copending U.S. patent application of Ser. No. 410,116 entitled "Barometric Altimeter", filed on Oct. 26, 1973, the relation between the altitude and the pressure in the ICAO standard atmosphere is expressed by:

$$P = P_0 e^{\frac{1}{2.261\times10^{-5}\times8431} \log_e(1-2.261\times10^{-5}H)} \quad (22)$$

where:
$P_0$: atmospheric pressure at the reference altitude,
P: atmospheric pressure at the altitude H
H ≤ 11,000m
By taking the logarithm of equation (22), we have $$\log_e \frac{P}{P_0} = 5.2459 \log_e(1-2.261\times10^{-5}H) \quad (23)$$

Figure 11:
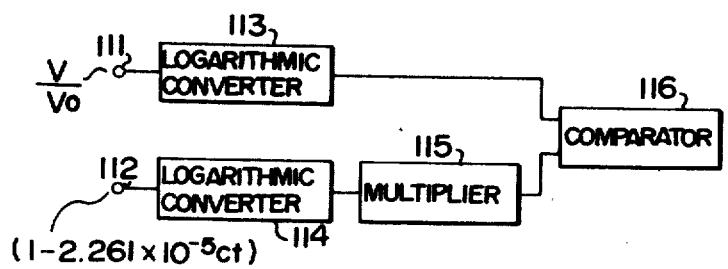
FIG. 11 shows a block diagram of a logarithmic embodiment of this invention.
Figure 12:
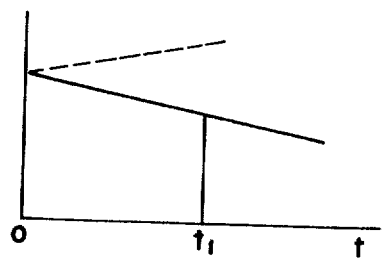
FIG. 12 shows a wave form of the function generator to be used in the embodiment of FIG. 11.

FIG. 11 shows the principle of measuring altitude H according to the equation (23). In the figure, 113 and 114 are logarithmic converters, 111 and 112 are their input terminals, 115 is a multiplier and 116 is a comparator. An electrical signal $V/V_0$ is applied to terminal 111, where V and $V_0$ are electrical signals proportional to P and $P_0$ respectively. An electrical signal is applied to terminal 112, which varies linearly with time as shown by FIG. 12, and is expressed by:

$$1 - 2.261 \times 10^{-5}ct \quad (24)$$

c: constant
t: time
The multiplier 115 multiplies the output of the logarithmic converter 114 by 5.2459 times and gives this multiplied signal to one of the inputs of the comparator 116 to detect the coincidence with the output of the logarithmic converter 113.

The interval of time $t_1$ between the start of the signal (24) and the occurrence of above coincidence is given by:

$$\log_e \frac{P}{P_0} = \log_e \frac{V}{V_0} = 5.2459 \log_e(1-2.261\times10^{-5}ct_1) \quad (25)$$

By comparing equations (23) and (25), we have
$$H = ct_1 \quad (26)$$

which shows that the altitude H is obtained by counting a signal of frequency c for the time interval $t_1$.

It is understood from the above that, when V and $V_0$ are proportional values to a power of P and $P_0$ respectively, the measurement of the altitude can still be performed by changing the factor of multiplication of the multiplier 115 accordingly.

When the altitude to be measured is below the reference altitude the measurement of altitude is done by using the linearly increasing signal as shown by the dotted line of FIG. 12.

Figure 13:
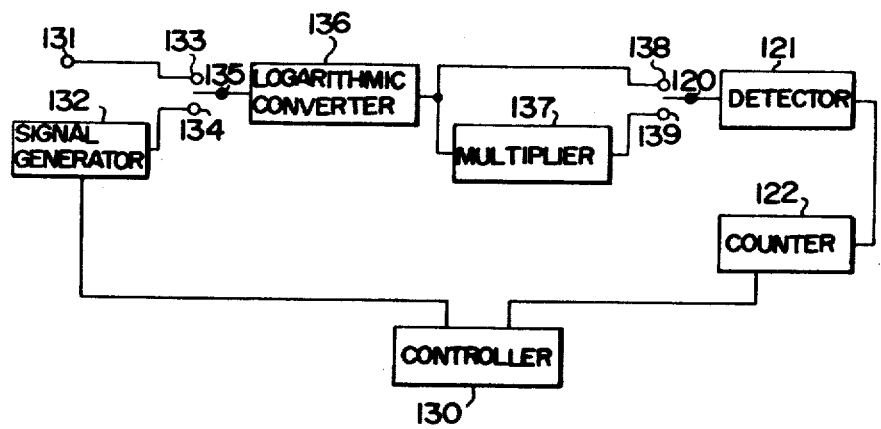
FIG. 13 shows a block diagram of another embodiment of this invention based on the logarithmic principle shown in FIG. 11.

FIG. 13 shows a block diagram of another embodiment of this invention. In FIG. 13, the signal $V/V_0$ is applied to terminal 131. The descriptions in U.S. Pat. No. 3693405, and my copending U.S. patent application Ser. No. 410,116 (cited above) show the means to obtain the signal $V/V_0$ and are applicable to this invention. The signal generator 132 generates the linear electrical signal represented by FIG. 12. It is well known that this signal can be generated by means of integrating a constant voltage, over time by an integrator. 136 Is a logarithmic converter, available on the market as a standardized module. 137 Is a multiplier, comprised, for example, of an operational amplifier with a negative feed back loop. The switches composed of switching contacts 133, 134 and 135, and switching contacts 138, 139 and 120 are operated synchronously and in an oscillatory manner so that when switching contacts 133 and 135 are closed, switching contacts 138 and 120 are closed. As a result, at time $t_1$, measured from the start time $t=0$ of the signal generator 132, fluctuation of the signal is no longer observed at the input of the detector 121, irrespective of the oscillating action of the switching contacts 133, 134, 135 and 138, 139, 120. The absence of the voltage fluctuation at the terminal 120 is detected by the detector 121. On the other hand the controller 130 sends out a signal at $t=0$ to start the signal generator 132 and a signal of frequency c to cause the counter 122 to be counted thereby. This counting is stopped by the output of the detector 121 at $t=t_1$ when the counter has counted $ct_1$ which represents the altitude H of the equation (26).

I claim:

1. A barometric altimeter for measuring altitude, comprising in combination:
    pressure sensing means for producing an electrical signal having a value corresponding to the altitude being measured, wherein the value of said electrical signal is approximated by a power series of the value of the altitude being measured;
    cascade accumulation means including memory means designated with addresses 0, 1, 2, . . . , N, where $N \geq 2$, and circuit means for algebraically adding the contents of said memory means having addresses 1, 2, . . . , N to the contents of said memory means having addresses 0, 1, 2, . . . , N−1 respectively, and thereby defining one cycle of cascade addition, wherein an interconnecting relationship is maintained between the inputs and outputs of said memory means with respect to said circuit means for algebraically adding during said one cycle, and said cascade accumulation means correlating a first variable and a second variable which have a digital mathematical relation, wherein said cascade accumulation means generates an output value equal to said first variable which is expressed as a power series of said second variable represented by the number of cycles of cascade additions;
    means for determining when said output value from said cascade accumulation means is equal to the value of said electrical signal produced by said pressure sensing means;
    means for counting the number of cycles of cascade additions, representing said second variable, up to said time of equality, and indicating therefrom a digital value of said measured altitude.

2. A barometric altimeter for measuring altitude, comprising in combination:
    pressure sensing means for producing an electrical signal having a value corresponding to the value of the altitude being measured, wherein the value of the altitude being measured is approximated by a power series of said value of said electrical signal;
    cascade accumulation means including memory means designated with addresses 0, 1, 2, . . . , N, where $N \geq 2$, and circuit for means for algebraically adding the contents of said memory means having addresses 1, 2, ..., N to the contents of said memory means having addresses 0, 1, 2, ..., N−1 respectively, and thereby defining one cycle of cascade addition, wherein an interconnecting relationship is maintained between the inputs and outputs of said memory means with repsect to said circuit means for algebraically adding during said one cycle, and said cascade accumulation means correlating a first variable and a second variable which have a digital mathematical relation, wherein said cascade accumulation means generates an output value equal to said first variable which is expressed as a power series of said second variable represented by the number of cycles of cascade additions;

means for determining when said second variable is equal to the value of said electrical signal produced by said pressure sensing means; and means for receiving said output value, equal to said first variable, at the time of equality and indicating therefrom a digital value of said measured altitude.

3. A barometric altimeter for measuring altitude:

a. means for generating a first electrical signal proportional to a ratio of the atmospheric pressure at the altitude being measured to the atmospheric pressure at a predetermined reference altitude;

b. means for converting said first electrical signal to a second electrical signal which is proportional to the logarithm of said first electrical signal;

c. means for generating a third electrical signal which varies linearly over a time period;

d. means for converting said third electrical signal to a fourth electrical signal which is proportional to the logarithm of said third electrical signal;

e. means for generating pulses of a constant frequency;

f. means for detecting when said second electrical signal and said fourth electrical signal become equal in value; and g. means for counting said pulses of a constant frequency during said period of time between the start of said third electrical signal and the time when said second electrical signal and said fourth electrical signal become equal in value, thereby obtaining the value of the altitude being measured.

4. A barometric altimeter for measuring altitude, comprising in combination:

pressure sensing means for producing a signal having a value corresponding to the altitude being measured, wherein the value of said signal is approximated by a power series of the value of the altitude being measured;

cascade accumulation means including memory means designated with addresses 0, 1, 2, ..., N, where $N \geq 2$, and circuit means for algebraically adding the contents of said memory means having addresses 1, 2, ..., N to the contents of said memory means having addresses 0, 1, 2, ..., N − 1 respectively, and thereby defining one cycle of cascade addition, said cascade accumulation means generates values of a first variable; in accordance with a digital mathematical relationship of said first variable and a second variable, wherein said first variable is expressed as a power series of said second variable;

means controlling the operation of said cascade accumulation means over a plurality of cycles of cascade additions until the time when the value generated by said cascade accumulation means equals the value of said signal from said pressure sensing means;

means for counting the number of cycles of cascade additions, representing said second variable, up to said time of equality and indicating therefrom a digital value of said measured altitude.

5. A barometric altimeter for measuring altitude comprising in combination:

pressure sensing means for producing a signal having a value corresponding to the value of the altitude being measured, wherein the value of the altitude being measured is approximated by a power series of said value of said signal;

cascade accumulation means including memory means designated with addresses 0, 1, 2, ..., N, where $N \geq 2$, and circuit means for algebraically adding the contents of said memory means having addresses 1, 2, ..., N to the contents of said memory means having addresses 0, 1, 2, ..., N − 1 respectively, and thereby defining one cycle of cascade addition, cascade accumulation means generating values of a first variable in accordance with a digital mathematical relationship of said first variable and a second variable wherein said first variable is expressed as a power series of said second variable;

means controlling the operation of said cascade addition means for a number of cycles of cascade additions corresponding to the value of said signal from said pressure sensing means; and means for receiving said value generated by said cascade accumulation means, equal to said first value, at the time of equality and indicating therefrom a digital value of said measured altitude.

* * * * *